(12) United States Patent
Zhang et al.

(10) Patent No.: US 11,472,019 B2
(45) Date of Patent: Oct. 18, 2022

(54) SUPPORT ASSEMBLY, ASSEMBLING TOOLING AND ASSEMBLING METHOD

(71) Applicant: BEIJING GOLDWIND SCIENCE & CREATION WINDPOWER EQUIPMENT CO., LTD., Beijing (CN)

(72) Inventors: Ke Zhang, Beijing (CN); Qingdong Zhao, Beijing (CN); Jinlei Liu, Beijing (CN)

(73) Assignees: BEIJING GOLDWIND SCIENCE & CREATION, Beijing (CN); WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/963,814

(22) PCT Filed: Oct. 30, 2018

(86) PCT No.: PCT/CN2018/112731
§ 371 (c)(1),
(2) Date: Jul. 21, 2020

(87) PCT Pub. No.: WO2020/000821
PCT Pub. Date: Jan. 2, 2020

(65) Prior Publication Data
US 2021/0053205 A1    Feb. 25, 2021

(30) Foreign Application Priority Data
Jun. 28, 2018    (CN) .......................... 201810685827.9

(51) Int. Cl.
*E04H 12/08*    (2006.01)
*B25H 1/10*    (2006.01)
(Continued)

(52) U.S. Cl.
CPC ............... *B25H 1/10* (2013.01); *E04H 12/08* (2013.01); *E04H 12/34* (2013.01); *F03D 13/20* (2016.05)

(58) Field of Classification Search
CPC . B64F 5/10; Y02E 10/72; F03D 13/20; E04H 12/08; E04H 12/085; E04H 12/34; F05B 2240/912; B25H 1/10
(Continued)

(56) References Cited

U.S. PATENT DOCUMENTS 7,624,488 B2 * 12/2009 Lum .......................... B25B 5/14
269/287
7,802,412 B2 * 9/2010 Jensen .................... F03D 13/20
52/651.07
(Continued)

FOREIGN PATENT DOCUMENTS

| CN | 203779017 U | 8/2014 |
|---|---|---|
| CN | 104832381 A | 8/2015 |

(Continued)

OTHER PUBLICATIONS

European Search Report in corresponding European Application No. 18924030.2 dated Feb. 2, 2021 (7 pages).
(Continued)

*Primary Examiner* — Babajide A Demuren
*Assistant Examiner* — Daniel J Kenny
(74) *Attorney, Agent, or Firm* — Bayes PLLC

(57) ABSTRACT

The present disclosure relates to a support assembly, an assembling tooling and an assembling method, wherein the support assembly includes: a fixing member extending in a first direction; a first hinge member, stacked on the fixing member on a second direction and connected to the fixing member; a support member, spaced apart from the first hinge member in the first direction, and stacked on the fixing
(Continued)

member on the second direction and connected to the fixing member; wherein in the second direction, a height of the support member is higher than that of the first hinge member, the first hinge member is adapted to rotatably connect with the tower tube segment and serve as a rotation fulcrum of the tower tube segment, and the support member is adapted to support the tower tube segment to maintain a position of the tower tube segment relative to the first hinge member.

20 Claims, 14 Drawing Sheets

(51) Int. Cl.
 *E04H 12/34* (2006.01)
 *F03D 13/20* (2016.01)
(58) Field of Classification Search
 USPC .......................................... 248/157, 398, 121
 See application file for complete search history.

(56) References Cited

U.S. PATENT DOCUMENTS

| | | | |
|---|---|---|---|
| 8,104,588 B2* | 1/2012 | Curlee | B62H 3/08 |
| | | | 211/20 |
| 8,413,963 B2* | 4/2013 | Pacheco, Jr. | B25H 1/0014 |
| | | | 254/133 R |
| 10,041,479 B2* | 8/2018 | Pedersen | E04H 12/345 |
| 10,046,866 B2* | 8/2018 | Lim | B64F 5/10 |
| 10,145,138 B2* | 12/2018 | Pedersen | F03D 13/20 |
| 10,160,076 B2* | 12/2018 | Chang | B64F 5/10 |
| 2009/0090069 A1* | 4/2009 | Willis | E04H 12/08 |
| | | | 52/79.12 |

FOREIGN PATENT DOCUMENTS

| | | |
|---|---|---|
| CN | 106414998 A | 2/2017 |
| CN | 106460798 A | 2/2017 |
| CN | 206290372 U | 6/2017 |
| CN | 107076106 A | 8/2017 |
| CN | 107076122 A | 8/2017 |
| CN | 206542358 U | 10/2017 |
| CN | 108131256 A | 6/2018 |
| EP | 2 626 547 A1 | 8/2013 |
| EP | 3 132 141 B1 | 2/2018 |
| WO | 2012003831 A2 | 1/2012 |
| WO | 2015/158350 A1 | 10/2015 |
| WO | 2015161855 A1 | 10/2015 |
| WO | 2016/055070 A1 | 4/2016 |
| WO | 2016/055071 A1 | 4/2016 |

OTHER PUBLICATIONS

International Search Report issued in corresponding International Application No. PCT/CN2018/112731, dated Apr. 1, 2019, 12 pages.
First Office action issued in Chinese Application No. 201810685827.9, dated Apr. 22, 2019, 6 pages.

* cited by examiner

SUPPORT ASSEMBLY, ASSEMBLING TOOLING AND ASSEMBLING METHOD

CROSS-REFERECE TO RELATED APPLICATIONS

This application is a National Phase of International Application No. PCT/CN2018/112731, filed on Oct. 30, 2018, which claims priority to Chinese Patent Application No. 201810685827.9, filed on Jun. 28, 2018U. The entire contents of each of the above-identified applications are hereby incorporated by reference.

TECHNICAL FIELD

The present disclosure relates to a technical filed of wind energy, and particularly relates to a support assembly, assembling tooling and assembling method.

BACKGROUND

A tower tube is an important structural form of high-rise structure, and is widely used in the fields of power transmission towers, television towers, and cooling towers. Especially in the field of wind power generation, the tower tube can be used to support an upper impeller and generator set. As a power of a wind turbine increases, a diameter of the impeller becomes larger and larger, and correspondingly, a height of the tower tube is higher and higher, and a cross-sectional size of the tower tube is also larger and larger.

In order to meet the requirements of transportation height limit, the tower tube of large diameter is usually segmented to multiple tower tube segments. During transportation, multiple tower tube segments are disposed one on top of another for transportation, and after in place, the tower tube segments need to be turned to a specific angle to meet assembling requirements. However, in the prior art, the method of turning and reassembling the tower tube segments is unreasonable, wherein a roller frame is often used as support tooling, and multiple cranes and rotating-lifting tools are required to achieve the turning of the tower tube segments, making the assembling process complicated and inefficient.

SUMMARY

The embodiments of the present disclosure provide a support assembly, an assembling tooling, and an assembling method, which can meet the requirements for turning of a tower tube segment, and can make the assembling process simple in operation and high in efficiency.

An aspect of the embodiments of the present disclosure provides a support assembly for tower tube segment, wherein the support assembly includes: a fixing member, extending in a first direction; a first hinge member, stacked on the fixing member on a second direction and connected to the fixing member; a support member, spaced apart from the first hinge member in the first direction, and stacked on the fixing member on the second direction and connected to the fixing member; wherein in the second direction, a height of the support member is higher than that of the first hinge member, the first hinge member is adapted to rotatably connect with the tower tube segment and serve as a rotation fulcrum of the tower tube segment, and the support member is adapted to support the tower tube segment to maintain a position of the tower tube segment relative to the first hinge member.

A further aspect of the embodiments of the present disclosure provides an assembling tooling for tower tube segment, wherein the assembling tooling includes: a base; a first support unit, disposed on the base and including two or more support assemblies as described above, the two or more support assemblies of the first support unit being spaced apart from each other in the third direction; a second support unit, disposed on the base opposite to the first support unit and including two or more support assemblies as described above, the two or more support assemblies of the second support unit being spaced apart from each other in the third direction; wherein the first hinge member of the first support unit and the first hinge member of the second support unit are arranged close to each other while the support member of the first support unit and the support member of the second support unit are arranged away from each other, and at least one of the first support unit and the second support unit is movably connected with the base to adjust a relative distance between the first support unit and the second support unit.

A further aspect of the embodiments of the present disclosure provides an assembling method for assembling tower tube segments, wherein the assembling method includes the following steps: providing an assembling tooling as described above; a step of mounting and turning a first tower tube segment, placing the first tower tube segment between the first support unit and the second support unit with the first tower tube segment being rotatably connected with the first hinge members of at least two support assemblies of the first support unit, and applying a force to the first tower tube segment so that the first tower tube segment rotates with the first hinge members connected to the first tower tube segment as fulcrums and is supported on the support members of the at least two support assemblies of the first support unit; a step of mounting and turning a second tower tube segment, placing the second tower tube segment between the first support unit and the second support unit with the second tower tube segment being rotatably connected with the first hinge members of at least two support assemblies of the second support unit, and applying a force to the second tower tube segment so that the second tower tube segment rotates with the first hinge members connected to the second tower tube segments as fulcrums and is supported on the support members of the at least two support assemblies of the second support unit; and an assembling step, adjusting a relative distance between the first support unit and the second support unit, so as to assemble the first tower tube segment and the second tower tube segment with each other.

According to the support assembly, assembling tooling and assembling method provided in the embodiments of the present disclosure, the support assembly includes a fixing member, a first hinge member and a support member, and the fixing member extends in a first direction, and the first hinge member and the support member are stacked on the fixing member in the second direction and connected to the fixing member, and are spaced apart from each other in the first direction. The height of the support member in the second direction is higher than that of the first hinge member, which can meet the requirements for supporting of the tower tube segment. As such, when the support assembly is in use, two or more support assemblies can be used in cooperation; by rotatably connecting the tower tube segment with the first hinge members and applying a force to the tower tube segment, the tower tube segment is rotated at a predetermined angle with the first hinge members as fulcrums and then is supported on the support members to realize the turning of the tower tube segment, which can meet the requirements for turning of the tower tube segment, and maintain the position of the tower tube segment relative to the first hinge members by the support member; and by moving the support assemblies, the tower tube segment connected to the support assemblies and having been turned can be assembled with other tower tube segments, and can further make the assembling process of the tower tube segments simple in operation and high in efficiency.

BRIEF DESCRIPTION OF THE DRAWINGS

The features, advantages, and technical effects of exemplary embodiments of the present disclosure will be described below with reference to the accompanying drawings.

REFERENCE NUMERALS

X-first direction; Y-second direction; Z-third direction;
1—assembling tooling;
100-base; 101-base body; 102-connecting frame;
200-first support unit;
300-second support unit;
400-mounting assembly; 401-mounting block; 401a-engaging groove;
10-support assembly;
11-fixing member; 111-support surface;
12-first hinge member; 12a-first end; 12b-second end; 121-mounting plate; 122-first support lug;
13-support member; 131-bottom plate; 132-top plate;
14-second hinge member; 14a-third end; 14b-fourth end; 141-connecting plate; 142-second support lug;
15-adapting member; 151-first adapting lug; 152-second adapting lug;
16-lifting bracket;
2-tower tube segment; 201-flange; 202-outer surface; 2a-first tower tube segment; 2b-second tower tube segment; 2c-third tower tube segment.

DETAILED DESCRIPTION

Features and exemplary embodiments of various aspects of the present disclosure will be described in detail below. In the following detailed description, numerous specific details are set forth to provide a full understanding of the present disclosure. However, it shall be apparent to the person skilled in the art that the present disclosure may be implemented without some of the details. The following description of the embodiments is made merely to provide a better understanding of the present disclosure by showing examples of the present disclosure. In the accompanying drawings and the following description, at least some of well-known structures and techniques are not shown to avoid unnecessarily obscuring the present disclosure. Further, for clarity, size of part of the structure may be exaggerated. Furthermore, features, structures, or characteristics described hereinafter may be combined in any suitable manner into one or more embodiments.

Orientations in the following description refer to directions as shown in the accompanying drawings, and are not intended to define specific structure of the embodiments of the present disclosure. In the description of the present disclosure, it shall be noted that, unless otherwise clearly stated and defined, the terms such as "mounting", "connection" shall be understood broadly, and may be, for example, a fixed connection, or a detachable connection, and may be a direct connection or an indirect connection. For the person skilled in the art, the specific meaning of the above terms in the present disclosure can be understood according to actual circumstance.

Figure 1:
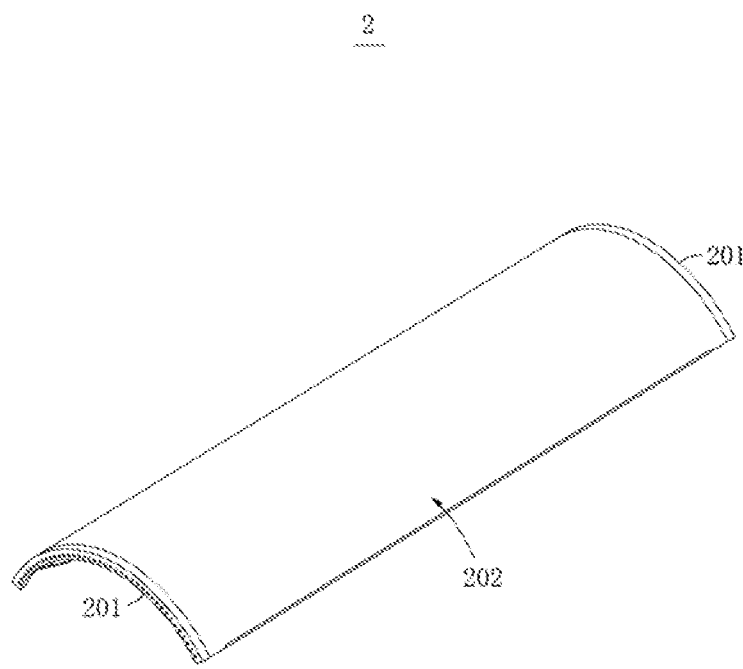
FIG. 1 is a structural schematic diagram of tower tube segment in the prior art.

FIG. 1 shows a structural schematic diagram of a tower tube segment in the prior art. The tower in the prior art is usually in the form of a cylinder; in order to meet the requirements of height limit of transportation, the tower in the form of the cylinder needs to be cut into multiple tower tube sections in its axial direction, and each tower tube section is cut into multiple tower tube segments 2 in its circumferential direction, each of which is formed as shown in FIG. 1; the tower tube segment 2 is usually formed as a curved sheet-like member, and is provided with flanges 201 at least on two axial ends; an outer peripheral surface of the tower tube segment 2 is hereinafter referred to as an outer surface 202, and each flange 201 is correspondingly provided with connection holes.

After being transported to a designated location by a transportation device, the multiple tower tube segments 2 need to be reassembled to form the tower tube section, and multiple tower tube sections are assembled to form a tower tube; the support assembly, assembling tooling and assembling method provided in the following embodiments of the present disclosure at least can be adapted to turn and/or assemble the corresponding tower tube segments 2.

In order to better understand the present disclosure, the support assembly, assembling tooling and assembling method according to the embodiments of the present disclosure will be described in detail below in combination with FIGS. 2 to 16; the support assembly, assembling tooling and assembling method provided in the embodiments of the present disclosure can be used for the above-mentioned tower tube segment 2.

Figure 2:
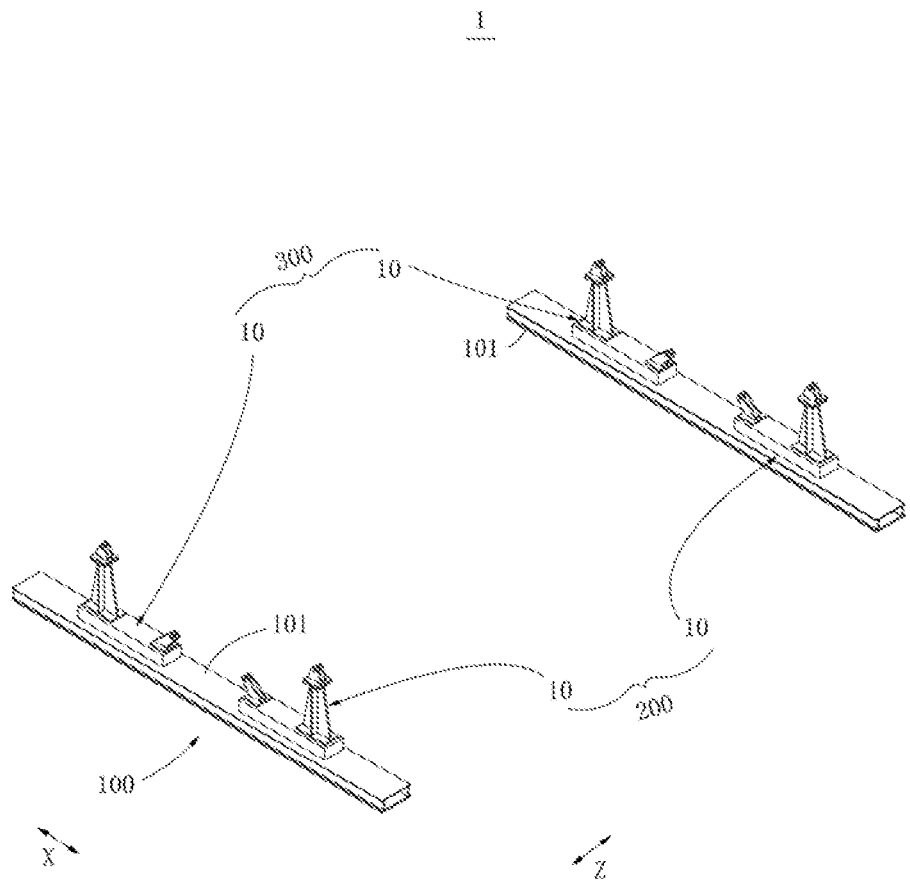
FIG. 2 is structural schematic diagram of an assembling tooling according to one embodiment of the present disclosure.

FIG. 2 shows a structural schematic diagram of an assembling tooling according to one embodiment of the present disclosure. Referring to FIG. 2, the assembling tooling 1 provided by one embodiment of the present disclosure includes a base 100, a first support unit 200 and a second support unit 300, wherein the first support unit 200 is disposed on the base 100, the first support unit 200 includes two or more support assemblies 10, and the two or more support assemblies 10 of the first support unit 200 are spaced apart from each other in a third direction Z. The second support unit 300 is disposed on the base 100 opposite to the first support unit 200, the second support unit 300 includes two or more support assemblies 10, and the two or more support assemblies 10 of the second support unit 300 are also spaced apart from each other in a third direction Z; wherein at least one of the first support unit 200 and the second support unit 300 is movably connected to the base 100 to adjust a relative distance between the first support unit 200 and the second support unit 300.

As an optional implementation, the support assemblies 10 of the first support unit 200 and that of the second support unit 300 have the same number and are provided in one-to-one correspondence. Optionally, the first support unit 200 and the second support unit 300 each includes two support assemblies 10, and both of the first support unit 200 and the second support unit 300 are movably connected to the base 100, specifically meaning that the respective support assemblies 10 of the first support unit 200 and the second support unit 300 are movably connected to the base 100 respectively; in a specific implementation, a guide rail may be provided on one of a fixing member 11 of the corresponding support assembly 10 and the base 100, and a guide groove slidably matched with the guide rail is provided on the other one, to realize the movable connection between the first and second support units 200, 300 and the base 100.

Said base 100 may be formed in different structures, and continuing to refer to FIG. 2, in some optional embodiments, the base 100 may be formed in a structure including two or more base bodies 101. The two or more base bodies 101 are spaced apart from each other in the third direction Z, and two support assemblies 10 of the first support unit 200 and the second support unit 300 provided in one-to-one correspondence are movably connected to one of the base bodies 101 respectively. The base body 101 may be a strip-shaped frame extending in the first direction X, and may be specifically made of square steel. Each base body 101 is provided with a guide rail or a guide groove, so as to meet the requirements of movable connection of the support assemblies 10 of the first support unit 200 and/or the second support unit 300. With the above-mentioned structure, on the basis of meeting the requirements for assembling of the tower tube segments 2, the base 100 can further make the distance between the two or more base units 101 adjustable, and thus make the assembling tooling 1 to be adapted to the assembling of the tower tube segments 2 with different lengths.

Figure 3:
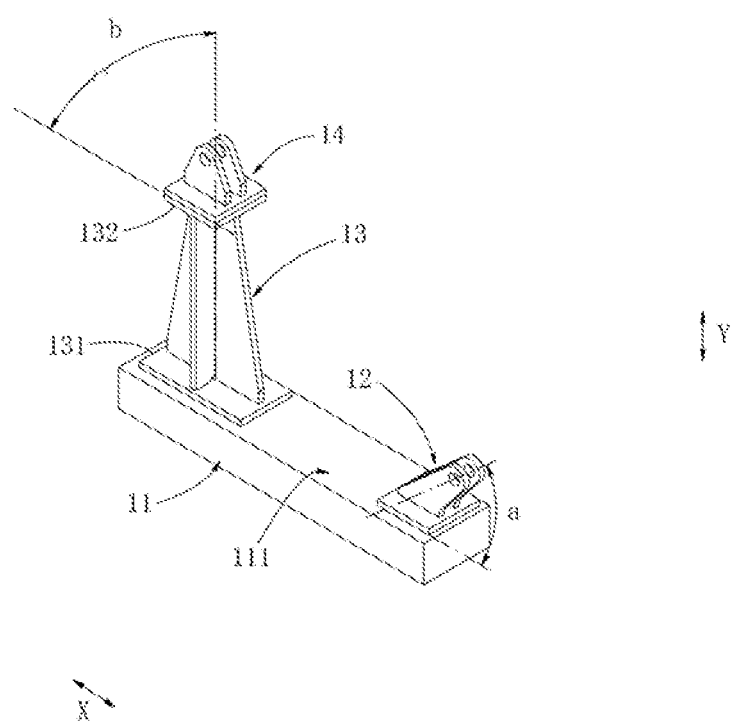
FIG. 3 is a structural schematic diagram of a support assembly according to an embodiment of the present disclosure.

FIG. 3 shows a structural schematic diagram of a support assembly according to an embodiment of the present disclosure; the embodiment of the present disclosure further provides a support assembly 10 that can be adapted for the above-mentioned assembling tooling 1 as a component of the first support unit 200 and the second support unit 300 of the assembling tooling 1.

Referring to FIG. 3 together, said support assembly 10 includes a fixing member 11, a first hinge member 12 and a support member 13, wherein the fixing member 11 extends in the first direction X, and the first hinge member 12 is stacked on the fixing member 11 in a second direction Y and is connected to the fixing member 11. The support member 13 is spaced apart from the first hinge member 12 in the first direction X, and is stacked on the fixing member 11 in the second direction Y and is connected to the fixing member 11. In the second direction Y, the height of the support 13 is higher than that of the first hinge member 12, the first hinge member 12 is adapted to rotatably connect with the tower tube segment 2 and serves as a rotation fulcrum of the tower tube segment 2, and the support member 13 is adapted to support the tower tube segment 2 to maintain the position of the tower tube segment 2 relative to the first hinge member 12.

Said first direction X, the second direction Y and the third direction Z intersects each other; and in some optional examples, the three directions may be perpendicular to each other.

When the support assembly 10 is applied to the assembling tooling 1, the first hinge member 12 of the first support unit 200 and the first hinge member 12 of the second support unit 300 are disposed close to each other, while the support member 13 of the first support unit 200 and the support member 13 of the second support unit 300 are disposed away from each other, so that when in use, the outer surfaces 202 of two tower tube segments having an assembling relationship faces away from each other.

Continuing to refer to FIG. 3, said fixing member 11 may be a block member extending in the first direction X and including a support surface 111 in the second direction Y, and specifically may be formed as a rectangular block member.

Figure 4:
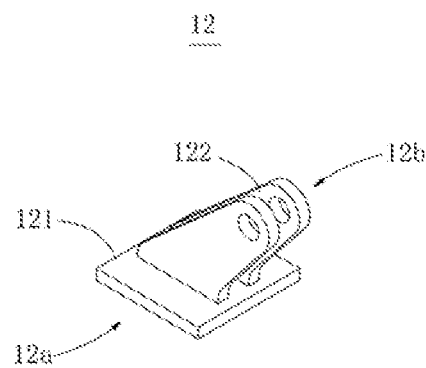
FIG. 4 is a structural schematic diagram of a first hinge member according to an embodiment of the present disclosure.

FIG. 4 shows a structural schematic diagram of the first hinge member 12 according to an embodiment of the present disclosure. Referring to FIG. 4 together, the first hinge member 12 includes a mounting plate 121 and first support lugs 122 spaced apart from each other in the third direction Z and disposed on the mounting plate 121. The first hinge member 12 as a whole includes a first end 12a and a second end 12b opposite to each other, wherein the mounting plate 121 is located at the first end 12a, the first end 12a of the first hinge member 12 is fixedly connected to the fixing member 11 and the second end 12b is adapted to rotatably connect with the tower tube segment 2; the first end 12a is specifically provided on the support surface 111 of the fixing member 11 via the mounting plate 121 and fixedly connected to the support surface 111 by a connection manner of welding, or a fastener such as a bolt. The second end 12b is rotatably connected to the tower tube segment 2 specifically via the first support lugs 122 spaced apart from each other. The connection line between the first end 12a and the second end 12b of the first hinge member 12 intersects the first direction X with an intersection angle of a, wherein a is any value in a numerical range of 0° to 90°, including the two end values, 0° and 90°, and is optionally any value between 30° and 70°, and further optionally, is 60°. The first hinge member 12 with the above-mentioned structure, is processed and manufactured conveniently, can ensure the connection strength with the fixing member 11, and also can better facilitate the rotational connection with the tower tube segment 2.

Said support member 13 may be formed by connecting a plurality of plates to each other, and one of the plates is used as a bottom plate 131, and is fixedly connected to the support surface 111 of the fixing member 11 by a connection manner of welding or a fastener, such as a bolt; the end of the support member 13 far away from the fixing member 11 may be directly used to support the tower tube segment 2 having been rotated relative to the first hinge member 12, and in order to better ensure the supporting effect to the tower tube segment 2, the end of the support member 13 away from the fixing member 11 may be provided with a surface matching with the outer surface 202 of the tower tube segment 2.

The above-mentioned support member 13 can meet the requirements for supporting of the tower tube segment 2; in order to better ensure the supporting effect to the tower tube segment 2, and meanwhile, to ensure the stability of the tower tube segment 2 having been turned relative to the first hinge member 12, as an optional implementation, the support assembly 10 further includes a second hinge member 14 disposed on the support member 13; in this case, the support member 13 may be provided with a plate parallel to the support surface 111 of the fixing member 11 as a top plate 132 on an end away from the fixing member 11, to connect with the second hinge member 14.

Figure 5:
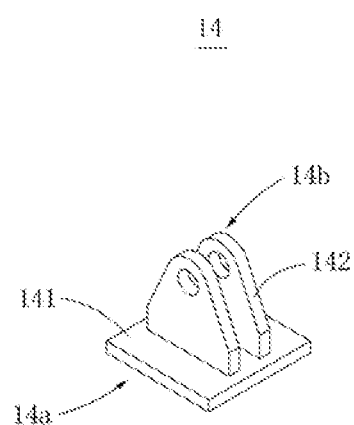
FIG. 5 is a structural schematic diagram of a second hinge member according to an embodiment of the present disclosure.

FIG. 5 shows a structural schematic diagram of the second hinge member 14 according to an embodiment of the present disclosure. Referring to FIG. 5 together, the second hinge member 14 includes a connecting plate 141 and second support lugs 142 spaced apart from each other in the third direction Z and disposed on the connecting plate 141. The second hinge member 14 as a whole includes a third end 14a and a fourth end 14b, and the third end 14a is fixedly connected to the support member 13, specifically by fixed connection of the connecting plate 141 with the top plate 132 of the support member 13 by means of welding, or a fastener, such as a bolt. The fourth end 14b is adapted to support the tower tube segment 2 and rotatably connect with the tower tube segment 2, and specifically, the fourth end 14b may support and rotatably connect with the tower tube segment 2 by the second support lugs 142. The connection line between said third end 14a and fourth end 14b intersects the first direction X with an intersection angle of b, wherein b is any value in a numerical range of 0° to 120°, including the two end values, 0° and 120°, and is optionally any value between 30° and 100°, and further optionally, is 90°.

Similarly, adapting the above-mentioned structure, the support member 13 and the second hinge member 14 may be processed conveniently, can ensure the connection strength with the fixing member 11, and can further improve the stability of the tower tube segment 2 having been turned on a basis of meeting the requirements for supporting of the tower tube segment 2 having been turned.

Figure 6:
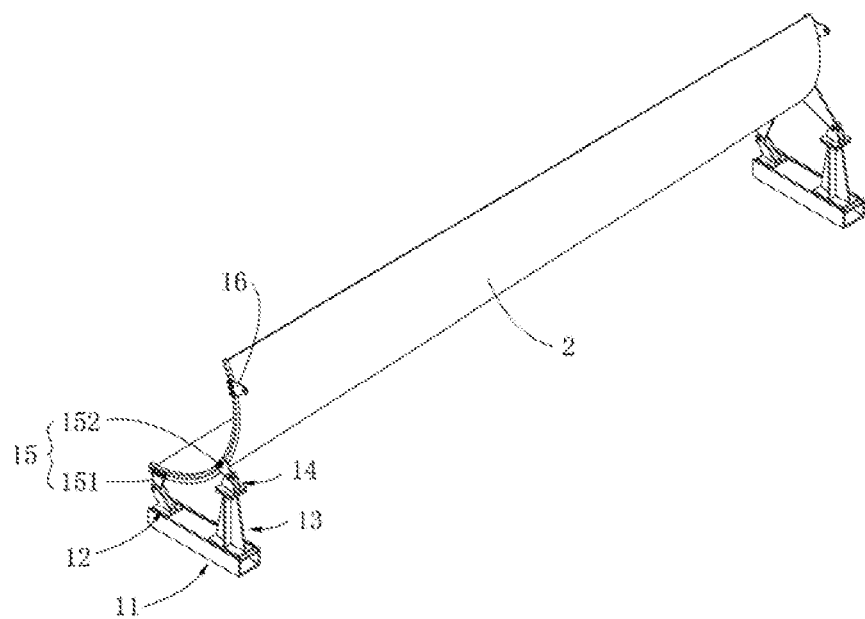
FIG. 6 is a schematic diagram of cooperation of the support assembly and the tower tube segment according to an embodiment of the present disclosure.

FIG. 6 shows a schematic diagram of cooperation of the support assembly 10 and the tower tube segment 2 according to an embodiment of the present disclosure. The support assembly 10 provided by the embodiment of the present disclosure, either being used independently for turning and supporting the tower tube segment 2 or being used for assembling tooling 1, needs to be rotatably connected with the tower tube segment 2 via the first hinge member 12 and the second hinge member 14, to achieve the assembly of the tower tube segments 2 on the basis of meeting the requirements for turning and supporting of the tower tube segments 2. Therefore, referring to FIG. 6 together, as an alternative implementation, the support assembly 10 further includes an adapting member 15, the adapting member 15 includes a first adapting lug 151 rotatably connected with the first hinge member 12 and a second adapting lug 152 rotatably connected with the second hinge member 14, and both of the first adapting lug 151 and the second adapting lug 152 can be fixedly connected to the tower tube segment 2.

The first adapting lug 151 and the second adapting lug 152 may be fixed on the tower tube segment 2 by welding or the like. Apparently, in order to optimize the performance of the tower tube formed by assembling the tower tube segments 2, optionally, the first adapting lug 151 and the second adapting lug 152 may be specifically connected to the flanges 201 on the ends of the tower tube segment 2 by fasteners, such as bolts. The first adapting lug 151 and the second adapting lug 152 are respectively provided with through holes corresponding to the connection holes on the flange 201. Moreover, the first adapting lug 151 is further provided with a through hole corresponding to the first support lugs 122 of the first hinge member 12 spaced apart from each other, and the first adapting lug 151 may be located between the two adjacent first support lugs 122 of the first hinge member 12, and pivotally connected with the first hinge member 12 via a rotating shaft; similarly, the second adapting lug 152 is further provided with a through hole corresponding to the second support lugs 142 of the second hinge member 14 spaced apart from each other, and the second adapting lug 152 may be located at the two adjacent second support lugs 142 of the second hinge member 14, and pivotally connected to the second hinge member 14 via a rotating shaft.

By providing the adapting member 15 and defining the adapting member 15 to include the first adapting lug 151 and the second adapting lug 152, the connection of the first hinge member 12 and the second hinge member 14 with the corresponding tower tube segment 2 can be facilitated, and the requirements for turning and assembling of the tower tube segment 2 can be better met; moreover, by adjusting the sizes of the first adapting lug 151 and the second adapting lug 152 of the adapting member, the support assembly 10 and the assembling tooling 1 can be adapted to the tower tube segment 2 of different sizes.

As can be seen from the above description, when turning the tower tube segment 2 on the support assembly 10, an external force needs to be applied, and then the tower tube segment 2 can be turned with the first hinge member 12 as the rotation fulcrum. Therefore, as an optional implementation, the support assembly 10 further includes a lifting bracket 16 that can be connected to the tower tube segment 2 and disposed on the tower tube segment 2 on a side opposite to the first adapting lug 151 relative to the second adapting lug 152. The lifting bracket 16 may be formed in different structures, may be formed as a support lug having the same shape as the first adapting lug 151, and apparently, other structures may be available, as long as it can meet the requirements for force application on the tower tube segment 2. The distribution of the lifting bracket 16 and the first and second adapting lugs 151, 152 on the tower tube segment 2 can further facilitate turning of the tower tube segment 2, and the turning of the tower tube segment 2 may be achieved with only one crane without the need of other rotating and lifting tools, etc., thereby saving space and costs of auxiliary turning equipment (such as the crane).

Figure 7:
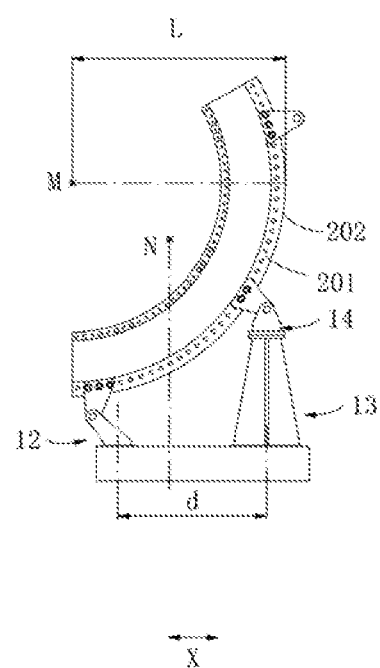
FIG. 7 is a front view of the structure shown in FIG. 6.

FIG. 7 shows a front view of the structure shown in FIG. 6. Referring to FIG. 7 together, when the first hinge member 12 of the support assembly 10 provided in the embodiment of the present disclosure is rotatably connected with the tower tube segment 2 and the support member 13 supports the tower tube segment 2, the center of gravity N of the tower tube segment 2 is located between the first hinge member 12 and the support member 13; with the above arrangement, the stability of the support assembly 10 turning and supporting the tower tube segment 2 can be further improved, and safety hazards such as deformation or rollover of the tower tube segment 2 caused by unevenness force on the tower tube segment 2 can be avoided. Said center of gravity of the tower tube segment 2 refers to the application point of the combined force of gravities of various parts of the tower tube segment 2, and the center of gravity may be located on the tower tube segment 2 or not on the tower tube segment 2, which is specifically determined according to the structure of the tower tube segment 2.

Continuing to refer to FIG. 7, as an alternative implementation, a distance between the first hinge member 12 and the support member 13 in the first direction X is d, and d is less than or equal to a maximum distance L of the center M of the tower tube segment 2 to the outer surface 202 of the tower tube segment 2. When the tower tube segment 2 is in a form of a segmental arc, that is, a cross section of the tower tube section formed by the tower tube segment 2 is circular, the center M of the tower tube segment 2 may be the center of a circle of the tower tube segment 2 or the tower tube section formed by the tower tube segment 2. When the tower tube segment 2 is in a form of a segmental polygon, that is, a cross section of the tower tube section formed by the tower tube segment 2 is polygonal, the center M of the tower tube segment 2 is the center of the circumcircle of the largest polygon of the tower tube section formed by the tower tube segment 2.

With above-mentioned setting, the distance between the first hinge member 12 and the support member 13 can better ensure the connection of the first hinge member 12 and the second hinge member 14 with the tower tube segment 2, on the basis of meeting the requirements for turning and supporting of the tower tube segment 2. In addition, the structure of the adapting member 15 can be further optimized on the basis of ensuring the requirements for connection of the first hinge member 12, the second hinge member 14 and the tower tube segment 2, so that the adapting member 15 has a size not too large, is subjected to a uniform force, and is not easily damaged.

Figure 8:
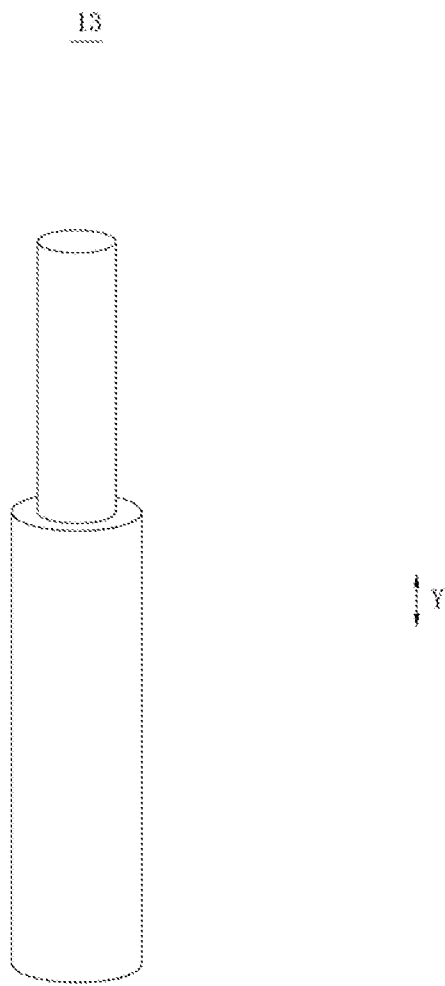
FIG. 8 is a structural schematic diagram of a support member according to another embodiment of the present disclosure.

The structure of the support member 13 in the above embodiments is only one optional implementation, but it is not limited to this; referring to FIG. 8 together, FIG. 8 shows a structural schematic diagram of the support member 13 according to another embodiment of the present disclosure. As an optional implementation, the support member 13 is telescopic in the second direction Y, and specifically, the support member 13 may be in a form of a telescopic cylinder, which may be a pneumatic cylinder, a hydraulic cylinder, or an electric cylinder; with the above structure, the support member 13 can make the support assembly 10 to have a more extensive application range, can meet the requirements for turning different angles of the tower tube segment 2, and achieve the stable support for the tower tube segment 2.

Therefore, the support assembly 10 provided by the embodiment of the present disclosure includes the fixing member 11, the first hinge member 12 and the support member 13, the fixing member 11 extends in the first direction X, and the first hinge member 12 and the support member 13 are stacked on the fixing member 11 in the second direction Y and connected with the fixing member 11, and are spaced apart from each other in the first direction X. Meanwhile, the height of the support member 13 in the second direction Y is higher than that of the first hinge member 12, which can meet the requirements for supporting of the tower tube segment 2. Therefore, when the support assembly 10 is in use, two or more support assemblies 10 can be used in cooperation to rotatably connect the tower tube segment 2 with the first hinge members 12. By applying a force to the tower tube segment 2, the tower tube segment 2 is rotated at a predetermined angle with the first hinge member 12 as the rotation fulcrum and then is supported on the support member 13, and thus the turning of the tower tube segment 2 is achieved and the requirements for turning the tower tube segment 2 is met; and, by maintaining the position of the tower tube segment 2 relative to the first hinge member 12 by means of the support member 13, the tower tube segment 2 connected to the support assembly 10 and having been turned can be assembled to other tower tube segment 2 by moving the support assembly 10, further making the assembling process of the tower tube segment 2 simple in operation and high in efficiency.

Meanwhile, the assembling tooling 1 provided in the embodiment of the present disclosure includes the base 100, the first support unit 200, and the second support unit 300, the first support unit 200 and the second support unit 300 are relatively disposed on the base 100 and each include two or more support assemblies 10 as described above, and the two or more support assemblies 10 of each of the first support unit 200 and the second support unit 300 are spaced apart from each other in the third direction Z. As such, when the assembling tooling 1 is in use, one tower tube segment 2 can be hinged with the first hinge members 12 of the at least two support assemblies 10 of the first support unit 200 and be turned, and another tower tube segment 2 can be hinged with the first hinge members 12 of the at least two support assemblies 10 of the second support unit 300 and be turned; since at least one of the first support unit 200 and the second support unit 300 is movably connected to the base 100, a relative distance between the first support unit 200 and the second support unit 300 may be adjusted to achieve the assembly of the two turned tower tube segments 2; similarly, the assembling process also has the advantages of simple operation and high efficiency.

Moreover, due to the turning and supporting manner of the tower tube segment 2 defined by the structures of the support assembly 10 and the assembling tooling 1 of the embodiment of the present disclosure, the support assembly 10 and the assembling tooling 1 can be applied not only to the tower tube with a circular cross section, but also be applied to the tower tube with a non-circular cross section, such as a polygonal cross-section, and thus have a wider range of applications.

Figure 9:
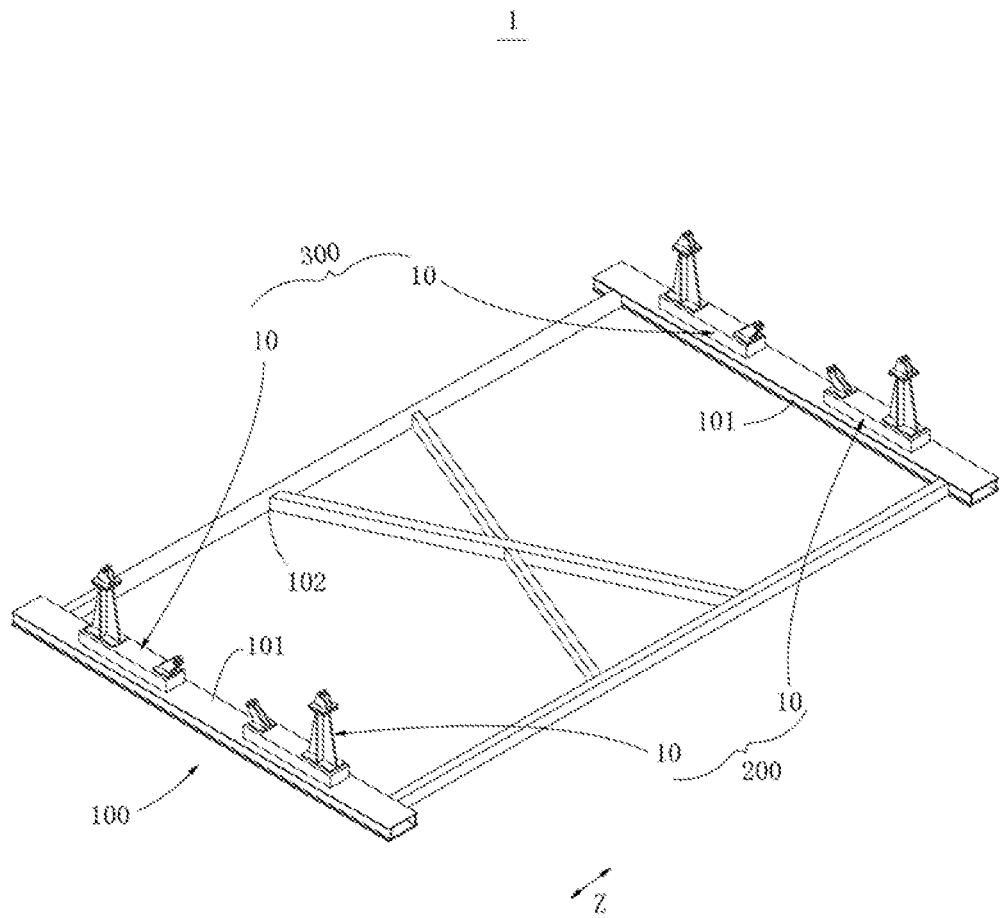
FIG. 9 is a structural schematic diagram of an assembling tooling according to another embodiment of the present disclosure.

FIG. 9 shows a structural schematic diagram of an assembling tooling according to another embodiment of the present disclosure; it shall be understood that, it is one of optional implementations that the base 100 of the assembling tooling 1 in the above various embodiments includes two or more base bodies 101, which are spaced apart from each other in the third direction Z, but the present disclosure is not limited to this. In some other optional embodiments, the base 100 may include an integral frame structure, the integral frame structure may be formed by a plurality of rigid rods connected to each other and have a predetermined strength, and it is apparently that a frame structure formed by a plate body provided with weight-reducing holes is available; in some examples, on a basis of including two or more base bodies 101 spaced apart from each other in the third direction, a connecting frame 102 connected between the two adjacent base bodies 101 is further included, so that the two or more base bodies 101 and the connecting frame 102 form an integral frame structure together. With such form, the base 100 can make the two or more base bodies 101 to be one integrity, ensuring the accuracy of placement of each base body 101.

Meanwhile, the first support unit 200 and the second support unit 300 of the assembling tooling 1 in the above various embodiments each include two support assemblies 10 and the two support assemblies 10 of the both are provided in one-to-one correspondence; this is one optional way, and the present disclosure is not limited to this. In some other examples, the number of the support assemblies 10 included in each of the both support units may be more than two, such as three, four, or more; meanwhile, the numbers of the support assemblies 10 included in the two support units are not limited to the same, and in some other examples, the numbers may be different, as long as the requirements for turning and assembling of the tower tube segment 2 can be met. Moreover, in some optional solutions, when the support assemblies 10 of the first support unit 200 and/or the second support unit 300 are movable relative to the base 100 in both of the first direction X and the third direction Z, the support assemblies 10 of the first support unit 200 and the second support unit 300 may not be provided in a one-to-one correspondence, and for example, may be arranged in a staggered manner in an initial state; the first support unit 200 and the second support unit 300 may be adjusted to have corresponding support assemblies 10 when in use, as long as the requirements for turning and assembling of the tower tube segment 2 can be met.

Figure 10:
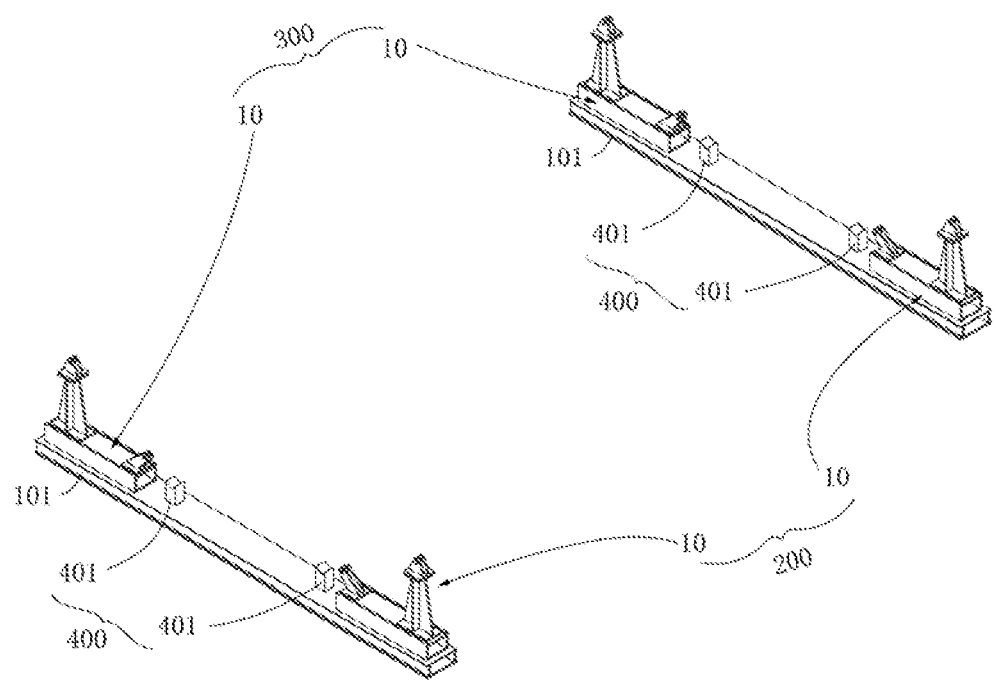
FIG. 10 is a structural schematic diagram of an assembling tooling according to yet another embodiment of the present disclosure.
Figure 11:
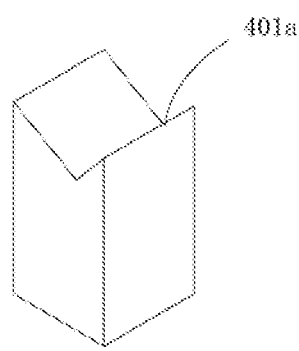
FIG. 11 is a structural schematic diagram of a mounting block according to an embodiment of the present disclosure.

FIG. 10 shows a structural schematic diagram of an assembling tooling according to another embodiment of the present disclosure, and FIG. 11 shows a structural schematic diagram of a mounting block according to an embodiment of the present disclosure. It shall be understood that, when connecting the corresponding tower tube segment 2 to the first support unit 200 and the second support unit 300, the tower tube segment 2 needs to be placed between the first support unit 200 and the second support unit 300 in advance. Therefore, as an optional implementation, referring to FIG. 10 and FIG. 11 together, the assembling tooling 1 further includes a mounting assembly 400, and the mounting assembly 400 may be disposed between two supporting assemblies 10 of the first support unit 200 and the second support unit 300 provided in a one-to-one correspondence; the mounting assembly 400 includes two or more mounting blocks 401, and the mounting block 401 is provided with an engaging groove 401a to engage with and support the tower tube segment 2. The engaging groove 401a is located at an end of the mounting block 401 away from the base 100, and may have a cross section in a shape of triangle or sector; by supporting the tower tube segment 2 via the respective mounting blocks 401 of the mounting assembly 400, two ends of the end flange of the tower tube segment 2 can be engaged into the corresponding engaging grooves 401a of the mounting blocks 401, thereby reducing the contact area between the tower tube segment 2 and the position on the assembling tooling 1 for supporting the tower tube segment 2, and thus reducing damage to the tower tube segment 2. Meanwhile, the mounting block 401 can ensure the supporting stability for the tower tube segment 2.

A detachable connection may be used between the respective mounting blocks 401 of the mounting assembly 400 and the base 100, which can prevent interference with the assembling of the tower tube segment 2 during the assembly, on the basis of meeting the requirements for supporting of the tower tube segment 2. In the case that the tower tube segment 2 is formed as a sheet with equal cross-sections in the length direction, the mounting blocks 401 of the mounting assembly 400 for supporting the flanges 201 at both ends of the tower tube segment 2 may be disposed opposite to each other. Apparently, in the case that the tower tube segment 2 has a cross section decreasing gradually in the length direction, that is, the tower tube section is formed as a cone, the mounting blocks 401 of the mounting assembly 400 for supporting the flanges 201 at both ends of the tower tube segment 2 may be adjusted according to their corresponding flanges 201; in this case, the first adapting lug 151 and/or the second adapting lug 152 of the corresponding adapting member 15 may be adjusted in size to achieve a better connection with the tower tube segment 2, as long as it can ensure that centers of the connecting holes of the first adapting lugs 151 disposed oppositely at both ends of the tower tube segment 2 are aligned with centers of the connecting holes of the first hinge members 12 for connecting with the first adapting lugs 151, and centers of the connecting holes of the oppositely disposed second adapting lugs 152 are aligned with centers of the connecting holes of the second hinge members 14 for connecting with the second adapting lugs 152, so as to ensure that the tower tube segment 2 can be better turned.

Figure 12:
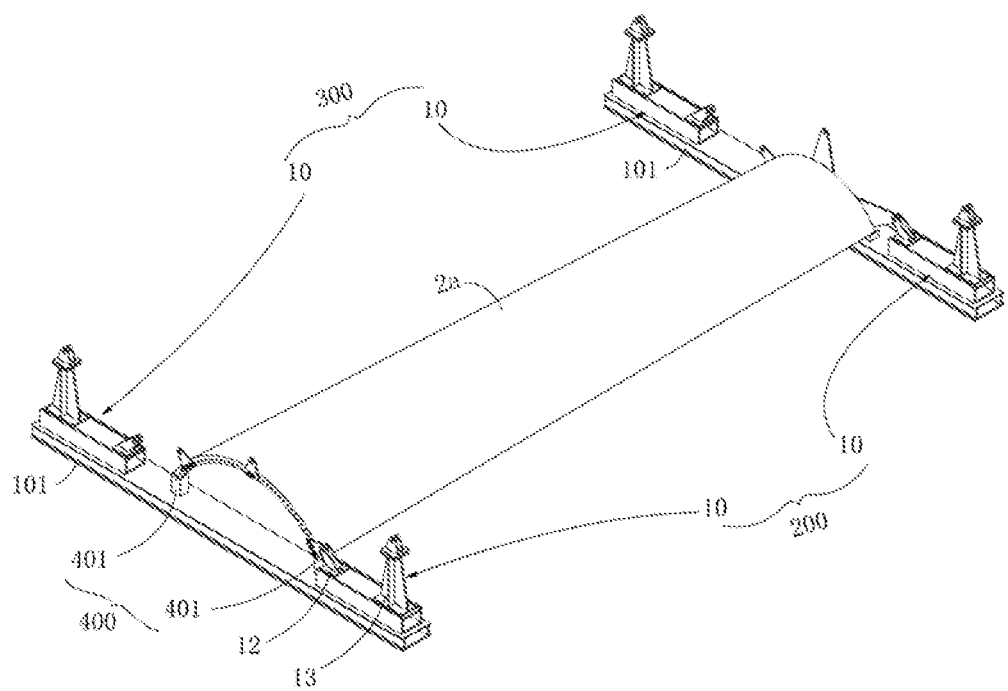
FIG. 12 is a schematic diagram of mounting of a first tower tube segment in an assembling method according to an embodiment of the present disclosure.
Figure 13:
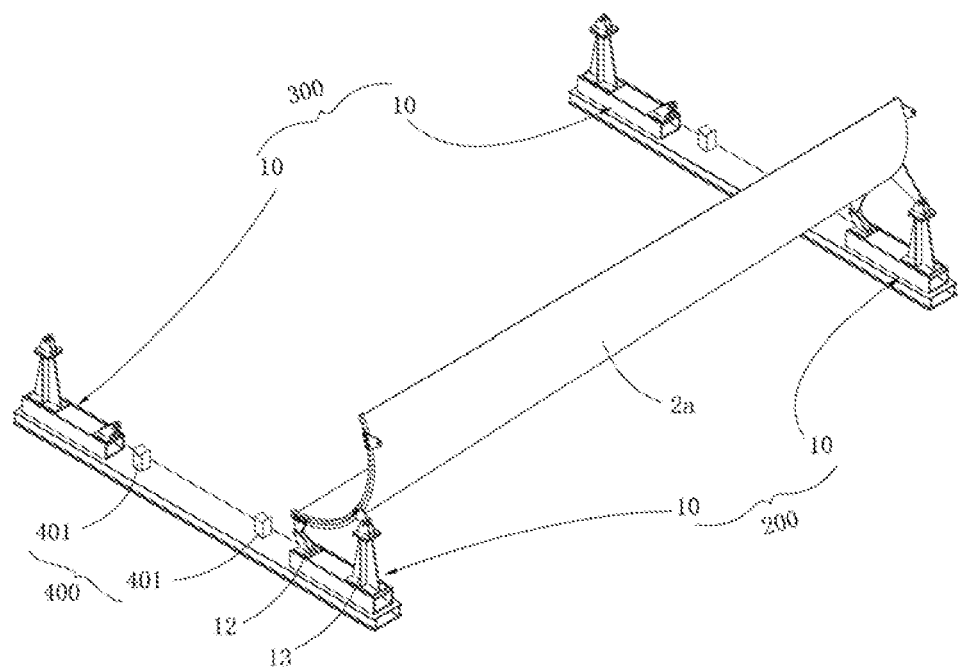
FIG. 13 is a schematic diagram of turning of a first tower tube segment in an assembling method according to an embodiment of the present disclosure.
Figure 14:
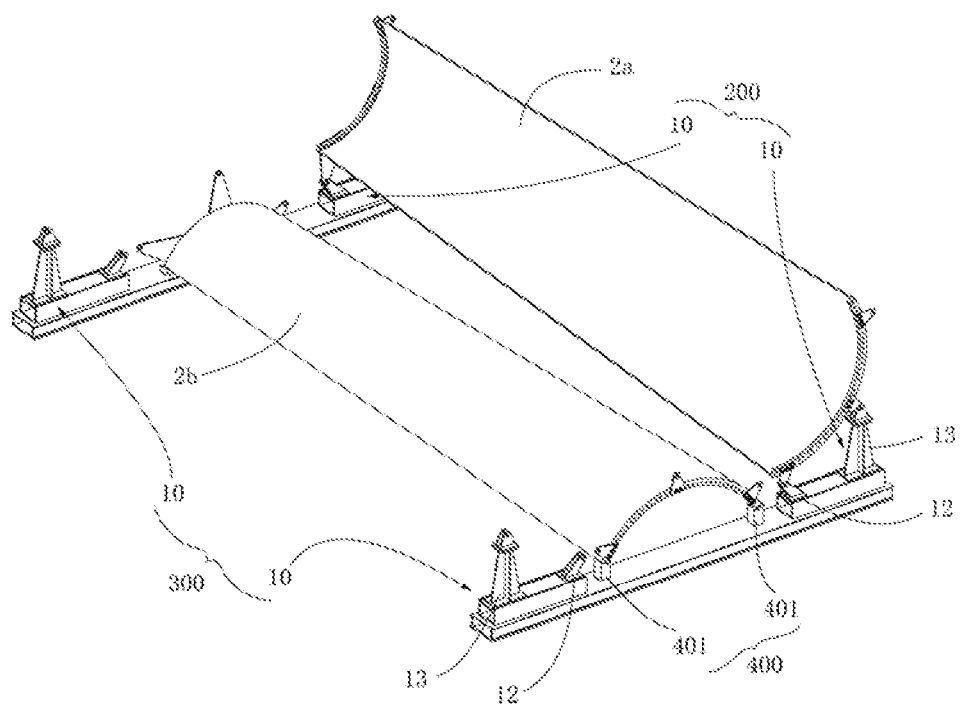
FIG. 14 is a schematic diagram of mounting of a second tower tube segment in an assembling method according to an embodiment of the present disclosure.
Figure 15:
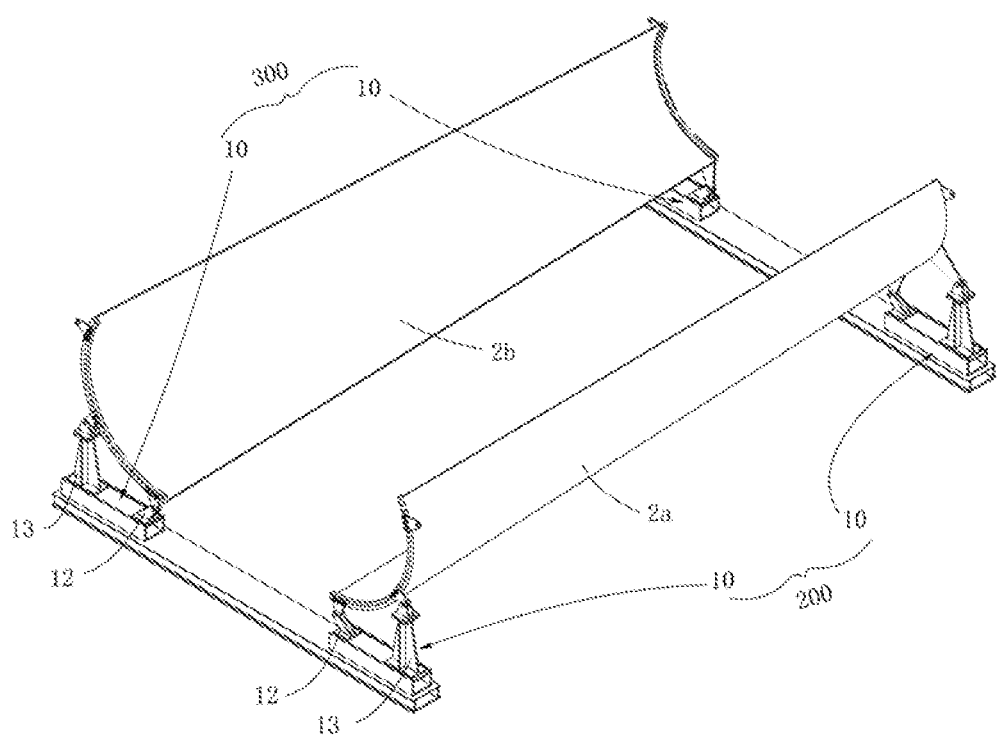
FIG. 15 is a schematic diagram of turning of a second tower tube segment in an assembling method according to an embodiment of the present disclosure.

FIG. 12 shows a schematic diagram of mounting of a first tower tube segment in an assembling method according to embodiment of the present disclosure, FIG. 13 shows a schematic diagram of turning of the first tower tube segment in the assembling method according to the embodiment of the present disclosure, FIG. 14 shows a schematic diagram of mounting a second tower tube segment in the assembling method according to the embodiment of the present disclosure, and FIG. 15 shows a schematic diagram of turning of the second tower tube segment in the assembling method according to the embodiment of the present disclosure.

The embodiment of the present disclosure further provides an assembling method, and the assembling method includes the following steps:

a step of providing an assembling tooling 1, wherein the assembling tooling 1 may be the assembling tooling 1 of any of the above embodiments;

a step of mounting and turning a first tower tube segment 2a, referring to FIGS. 12 and 13, the first tower tube segment 2a is placed, optionally horizontally placed, between the first support unit 200 and the second support unit 300, the first tower tube segment 2a is rotatably connected to the first hinge members 12 of at least two support assemblies 10 of the first support unit 200, and a force is applied to the first tower tube segment 2a so that the first tower tube segment 2a rotates with the first hinge members 12 connected thereto as a fulcrum, and is supported on the support members 13 of the at least two support assemblies 10 of the first support unit 200;

a step of mounting and turning a second tower tube segment 2b, referring to FIGS. 14 and 15, the second tower tube segment 2b is placed, optionally horizontally placed, between the first support unit 200 and the second support unit 300, the second tower tube segment 2b is rotatably connected to the first hinge members 12 of at least two support assemblies 10 of the second support unit 300, and a force is applied to the second tower tube segment 2b so that the second tower tube segment 2b rotates with the first hinge members 12 connected thereto as a fulcrum, and is supported on the support members 13 of the at least two support assemblies 10 of the second support unit 300; and an assembling step, a relative distance between the first support unit 200 and the second support unit 300 is adjusted, and the first support unit 200 or the second support unit 300 may be pushed, so that the first support unit 200 and the second support unit 300 moves closer to each other and the first tower tube segment 2a and the second tower tube segment 2b are assembled together.

In the step of mounting and turning the first tower tube segment 2a and the step of mounting and turning the second tower tube segment 2b, the "horizontally placed" refers to that center lines of the first tower tube segment 2a and the second tower tube segment 2b are disposed horizontally or that axis of the tower tube section formed by the first tower tube segment 2a and the second tower tube segment 2b is disposed horizontally.

In the case that the assembling tooling 1 includes the mounting assembly 400, in the step of mounting and turning the first tower tube segment 2a and the step of mounting and turning the second tower tube segment 2b, the first tower tube segment 2a and the second tower tube segment 2b may be placed on the mounting assembly 400 between the first support unit 200 and the second support unit 300 and then be turned relative to the first support unit 200 and the second support unit 300; moreover, the mounting assembly 400 is removed from the base 100 of the assembly unit before the assembling step 400.

As an optional implementation, the first tower tube segment 2a and the second tower tube segment 2b have opposite rotation directions, and optionally, rotation angles of the first tower tube segment 2a and the second tower tube segment 2b have equal absolute values, enabling the outer surfaces 202 of the first tower tube segment 2a and the second tower tube segment 2b to face away from each other, thereby better assembling the tower tube segments.

Figure 16:
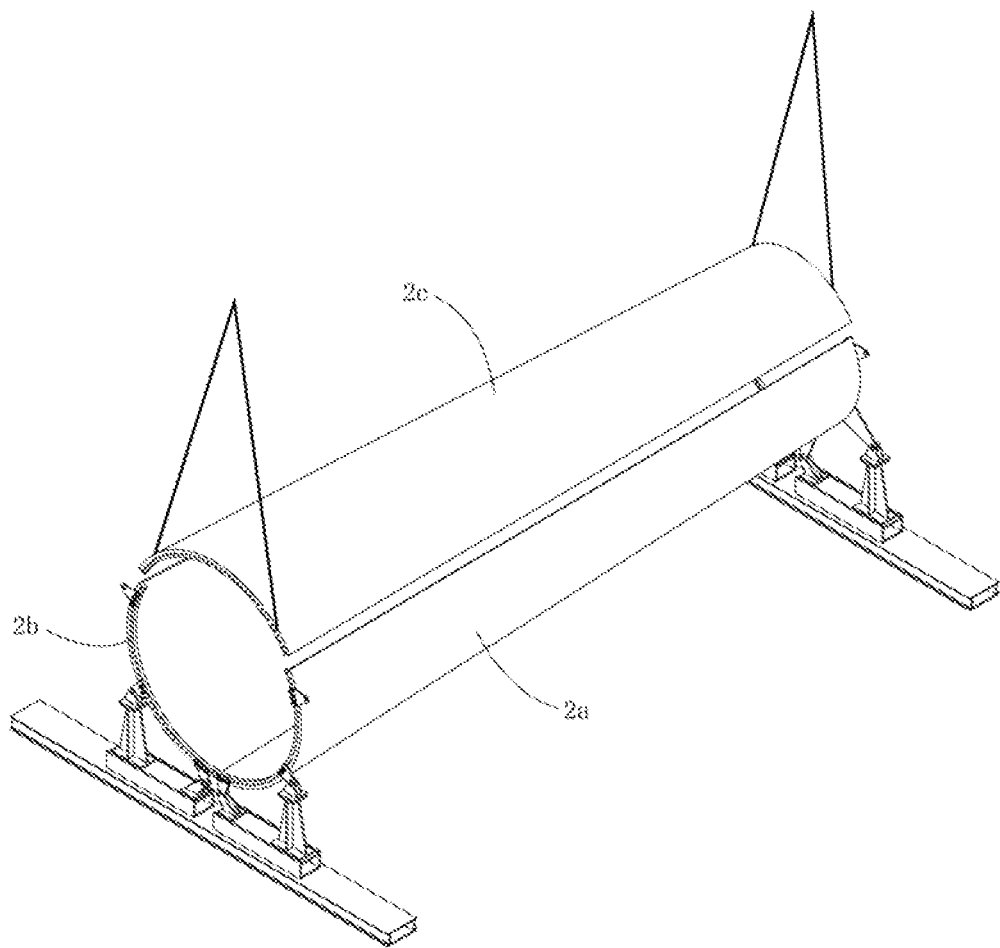
FIG. 16 is a schematic diagram of assembling of a third tower tube segment in an assembling method according to an embodiment of the present disclosure.

FIG. 16 shows a schematic diagram of assembling of a third tower tube segment in an assembling method according to an embodiment of the present disclosure.

The assembling method provided by the embodiment of the present disclosure may be adapted to assembly of the tower tube section including two or more tower tube segments; in the case that the tower tube section includes two tower tube segments, the assembly of the tower tube section can be completed directly by the method of the above embodiments; apparently, in the case that the tower tube section includes three pieces, in the assembling step of the method of the above embodiments, referring to FIG. 16 together, the tower tube segment group formed by assembly of the first tower tube section 2a and the second tower tube segment 2b has an opening; at this time, the assembling step further includes hoisting, optionally, horizontally hoisting, a third tower tube segment 2c onto the opening, and assembling the third tower tube segment 2c with the first tower tube segment 2a and the second tower tube segment 2b to form a tower tube section.

Apparently, the above embodiments are described by taking the tower tube section including two or three tower tube segments 2 as an example, which is an optional implementation, but the present disclosure is not limited to this, and the assembling method provided by the embodiments of the present disclosure can also be adapted to assembly of the tower tube section including three or more tower tube segments.

For example, taking the tower tube section including four tower tube segments 2 as an example, two of the four tower tube segments 2 can be assembled by repeating the embodiment shown in FIGS. 12 to 15, and then the assembled two tower tube segments 2 are removed from the assembling tooling 1 and serve as a new first tower tube segment for next assembly; the other two tower tube segments 2 can be assembled by repeating the embodiment shown in FIGS. 12 to 15, and then the assembled two tower tube segments 2 are removed from the assembling tooling 1 and serve as a new second tower tube segment for the next assembly; the new first tower tube segment and the new second tower tube segment can be assembled by repeating the embodiment shown in FIGS. 12 to 15, and thus the assembly of the tower tube section including four tower tube segments is completed.

Further, taking the tower tube section including five tower tube segments 2 as an example, two of the five tower tube segments 2 can be assembled by repeating the embodiment shown in FIGS. 12 to 15, and then the assembled two tower tube segments 2 are removed from the assembling tooling 1 and serve as a new first tower tube segment for next assembly; another two tower tube segments 2 can be assembled by repeating the embodiment shown in FIGS. 12 to 15, and then the assembled two tower tube segments 2 are removed from the assembling tooling 1 and serve as a new second tower tube segment for the next assembly; the new first tower tube segment and the new second tower tube segment can be assembled by repeating the embodiment shown in FIGS. 12 to 15, forming a tower tube segment group with an opening; and the last tower tube segment 2 is hoisted onto the opening and assembled with the new first tower tube segment and the new second tower tube segment, and thus the assembly of the tower tube section including five tower tube segments is completed. By analogy, the assembling method provided by the embodiments of the present disclosure can also achieve the assembly of the tower tube section including six, seven, or more tower tube segments.

Therefore, the assembling method provided by the embodiments of the present disclosure includes the step of providing the assembling tooling 1 of the above various embodiments, the step of mounting and turning the first tower tube segment 2a, the step of mounting and turning the second tower tube segment 2b, and the assembling step; since the assembling method includes the above-mentioned assembling tooling 1, can meet the requirements for turning of the first tower tube segment 2a and the second tower tube segment 2b by the step of mounting and turning the first tower tube segment 2a and the step of mounting and turning the second tower tube segment 2b, and can meet the requirements for assembling the first tower tube segment 2a and the second tower tube segment 2b in the assembling step by adjusting the relative distance between the first support unit 200 and the second support unit 300 of the assembling tooling 1, the assembling method of the present disclosure can meet the requirements for assembly of various tower tube sections including two or more tower tube segments, the assembly positioning is accurate, the assembly difficulty of the tower tube segments 2 is reduced, the assembling process is simple in operation and high in efficiency, and thus the method is easy to use and promote.

Although the disclosure has been described with reference to the preferred embodiments, various improvements can be made and components therein can be replaced with equivalents without departing from the scope of the present disclosure. In particular, as long as there is no structural conflict, various technical features mentioned in the various embodiments can be combined in any way. The present disclosure is not limited to the specific embodiments disclosed herein, but includes all technical solutions falling within the scope of the claims.

What is claimed is:

1. A support assembly for a tower tube segment, wherein the support assembly comprises:
   a fixing member, extending in a first direction;
   a first hinge member, stacked on the fixing member in a second direction and connected to the fixing member by a mounting plate, the mounting plate extending in the first direction, the mounting plate and fixing member being in parallel planes;
   a support member stacked on the fixing member in the second direction and connected to the fixing member by a bottom plate, the bottom plate longitudinally extending in the first direction parallel to the fixing member, the bottom plate and fixing member being in parallel planes, the bottom plate spaced apart from the mounting plate in the first direction;
   wherein in the second direction, a height of the support member is higher than that of the first hinge member, the first hinge member is adapted to rotatably connect with the tower tube segment and serve as a rotation fulcrum of the tower tube segment, and the support member is adapted to support the tower tube segment to maintain a position of the tower tube segment relative to the first hinge member.

2. The support assembly according to claim 1, wherein the first hinge member comprises a first end and a second end opposite to each other, the first end is fixedly connected with the fixing member while the second end is adapted to rotatably connect with the tower tube segment, and a connection line between the first end and the second end intersects the first direction with an intersection angle of a, wherein a numerical range of a is 0° to 90°.

3. The support assembly according to claim 1, further comprising a second hinge member disposed on the support member, and the second hinge member comprises a third end and a fourth end opposite to each other, wherein the third end is fixedly connected with the support member, the fourth end is adapted to support the tower tube segment and rotatably connect with the tower tube segment, and a connection line between the third end and the fourth end intersects the first direction with an intersection angle of b, wherein a numerical range of b is 0° to 120°.

4. The support assembly according to claim 3, further comprising an adapting member, the adapting member comprises a first adapting lug rotatably connected with the first hinge member and a second adapting lug rotatably connected with the second hinge member, and the first adapting lug and the second adapting lug can be fixedly connected to the tower tube segment.

5. The support assembly according to claim 4, further comprising a lifting bracket, the lifting bracket can be connected to the tower tube segment, and the lifting bracket and the first adapting lug are disposed on the tower tube segment at two opposite sides relative to the second adapting lug.

6. The support assembly according to claim 1, wherein a distance between the first hinge member and the support member in the first direction is d, and d is less than or equal to a maximum distance L from a center M of the tower tube segment to an outer surface of the tower tube segment.

7. The support assembly according to claim 1, wherein the support member is telescopic in the second direction.

8. The support assembly according to claim 1, wherein when the first hinge member is rotatably connected with the tower tube segment and the support member supports the tower tube segment, a center of gravity N of the tower tube segment is located between the first hinge member and the support member.

9. An assembling tooling for the tower tube segment, wherein the assembling tooling comprises:
   a base;
   a first support unit, disposed on the base and comprising two or more support assemblies according to claim 1, the two or more support assemblies of the first support unit being spaced apart from each other in the third direction;
   a second support unit, disposed on the base opposite to the first support unit and comprising two or more support assemblies according to claim 1, the two or more support assemblies of the second support unit being spaced apart from each other in the third direction;
   wherein the first hinge member of the first support unit and the first hinge member of the second support unit are arranged close to each other while the support member of the first support unit and the support member of the second support unit are arranged away from each other, and at least one of the first support unit and the second support unit is movably connected with the base to adjust a relative distance between the first support unit and the second support unit.

10. The assembling tooling according to claim 9, wherein the first hinge member comprises a first end and a second end opposite to each other, the first end is fixedly connected with the fixing member while the second end is adapted to rotatably connect with the tower tube segment, and a connection line between the first end and the second end intersects the first direction with an intersection angle of a, wherein a numerical range of a is 0° to 90°.

11. The assembling tooling according to claim 9, further comprising a second hinge member disposed on the support member, and the second hinge member comprises a third end and a fourth end opposite to each other, wherein the third end is fixedly connected with the support member, the fourth end is adapted to support the tower tube segment and rotatably connect with the tower tube segment, and a connection line between the third end and the fourth end intersects the first direction with an intersection angle of b, wherein a numerical range of b is 0° to 120°.

12. The assembling tooling according to claim 11, further comprising an adapting member, the adapting member comprises a first adapting lug rotatably connected with the first hinge member and a second adapting lug rotatably connected with the second hinge member, and the first adapting lug and the second adapting lug can be fixedly connected to the tower tube segment.

13. The assembling tooling according to claim 9, wherein the support assemblies of the first support unit and the support assemblies of the second support unit have the same number and are provided in one-to-one correspondence.

14. The assembling tooling according to claim 13, wherein the assembling tooling further comprises a mounting assembly, the mounting assembly is disposed between two support assemblies of the first support unit and the second support unit provided in one-to-one correspondence, and comprises two or more mounting blocks, wherein the mounting block is provided with an engaging groove for engaging with and supporting the tower tube segment.

15. The assembling tooling according to claim 13, wherein the base comprises two or more base bodies spaced apart from each other in the third direction, and the two support assemblies of the first support unit and the second support unit provided in one-to-one correspondence are movably connected to one of the base bodies, respectively.

16. The assembling tooling according to claim 13, wherein the base comprises an integral frame structure, and the support assemblies of each of the first support unit and the second support unit are movably connected to the frame structure respectively.

17. An assembling method for assembling tower tube segments, wherein the assembling method comprises the following steps:
   providing an assembling tooling according to claim 9;
   a step of mounting and turning a first tower tube segment, placing the first tower tube segment between the first support unit and the second support unit with the first tower tube segment being rotatably connected with the first hinge members of at least two support assemblies of the first support unit, and applying a force to the first tower tube segment so that the first tower tube segment rotates with the first hinge members connected to the first tower tube segment as fulcrums and is supported on the support members of the at least two support assemblies of the first support unit;
   a step of mounting and turning a second tower tube segment, placing the second tower tube segment between the first support unit and the second support unit with the second tower tube segment being rotatably connected with the first hinge members of at least two support assemblies of thesecond support unit, and applying a force to the second tower tube segment so that the second tower tube segment rotates with the first hinge members connected to the second tower tube segments as fulcrums and is supported on the support members of the at least two support assemblies of the second support unit; and
   an assembling step, adjusting a relative distance between the first support unitand the second support unit, so as to assemble the first tower tube segment and the second tower tube segment with each other.

18. The assembling method according to claim 17, comprising at least one of the following features: the first tower tube segment and the second tower tube segment have opposite rotation directions; and rotation angles of the first tower tube segment and the second tower tube segment have equal absolute values.

19. The assembling method according to claim 18, wherein in the assembling step, the first tower tube segment and the second tower tube segment are assembled to form a tower tube segment group with an opening, and the assembling step further comprises hoisting a third tower tube segment onto the opening and assembling the third tower tube segment with the first tower tube segment and the second tower tube segment to form a tower tube section.

20. The assembling method according to claim 17, wherein in the assembling step, the first tower tube segment and the second tower tube segment are assembled to form a tower tube segment group with an opening, and the assembling step further comprises hoisting a third tower tube segment onto the opening and assembling the third tower tube segment with the first tower tube segment and the second tower tube segment to form a tower tube section.

\* \* \* \* \*